(12) United States Patent
Rachwal

(10) Patent No.: US 8,707,474 B2
(45) Date of Patent: Apr. 29, 2014

(54) TOILET CONTROLS

(76) Inventor: Ervin J. Rachwal, Sarasota, FL (US)

( * ) Notice: Subject to any disclaimer, the term of this patent is extended or adjusted under 35 U.S.C. 154(b) by 608 days.

(21) Appl. No.: 12/464,454

(22) Filed: May 12, 2009

(65) Prior Publication Data

US 2009/0282610 A1 Nov. 19, 2009

Related U.S. Application Data

(60) Provisional application No. 61/052,732, filed on May 13, 2008.

(51) Int. Cl.
*E03D 1/00* (2006.01)
*E03D 11/02* (2006.01)
*E03D 1/36* (2006.01)

(52) U.S. Cl.
USPC .................. 4/415; 4/426; 4/427; 4/366

(58) Field of Classification Search
USPC ............. 4/353, 427, 661, 354, 355, 356, 357, 4/332, 331, 373, 372, 379, 378, 381, 382, 4/389, 396, 397, 415, 426, 366, 367, 390, 4/411, 412
See application file for complete search history.

(56) References Cited

U.S. PATENT DOCUMENTS

| | | | | |
|---|---|---|---|---|
| 840,613 A * | 1/1907 | Findeisen | ............. | 4/346 |
| 2,088,864 A | 8/1937 | McGrath | | |
| 3,574,867 A | 4/1971 | Biniores | | |
| 3,722,850 A | 3/1973 | Kemper | | |
| 3,908,204 A * | 9/1975 | Hopkins | ............ | 4/406 |
| 3,945,056 A * | 3/1976 | Kowalski et al. | ............. | 4/325 |
| 4,110,849 A * | 9/1978 | LaFaver | ............. | 137/435 |
| 4,143,433 A * | 3/1979 | Skousgaard | ............. | 4/354 |
| 4,183,108 A * | 1/1980 | Hamilton | ............. | 4/354 |
| 4,216,555 A * | 8/1980 | Detjen | ............. | 4/324 |
| 4,993,086 A * | 2/1991 | Palmer | ............. | 4/363 |
| 5,230,104 A | 7/1993 | Ocampo | | |
| 5,421,038 A | 6/1995 | Zamudio-Castillo et al. | | |
| 5,642,533 A | 7/1997 | Young | | |
| 5,647,068 A * | 7/1997 | Jensen | ............. | 4/415 |
| 5,669,083 A * | 9/1997 | Leombruni, Sr. | ............. | 4/415 |
| 5,715,859 A | 2/1998 | Nichols-Roy | | |
| 5,752,281 A * | 5/1998 | Conner | ............. | 4/427 |
| 5,769,111 A * | 6/1998 | Han | ............. | 137/312 |
| 5,862,537 A | 1/1999 | Osmond | | |
| 5,975,125 A | 11/1999 | Nichols-Roy | | |
| 6,003,541 A | 12/1999 | Nichols-Roy | | |
| 6,032,303 A * | 3/2000 | Schmidt | ............. | 4/427 |
| 6,041,452 A * | 3/2000 | Hsiao et al. | ............. | 4/326 |

(Continued)

*Primary Examiner* — Len Tran
*Assistant Examiner* — Alexander M Valvis
(74) *Attorney, Agent, or Firm* — Tarolli, Sundheim, Covell & Tummino LLP

(57) ABSTRACT

Controls for use in association with a toilet conserve water by allowing the amount of water utilized for each flush to be varied. The controls conserve water by minimizing the amount of water lost in the event of either a minor leak or a major leak. The controls may include a magnet to raise a float connected with a water float control valve. The controls may include water level sensor apparatus. The controls may include a force transmission assembly which effects operation of water inlet and outlet valves under the influence of force transmitted from a handle of a toilet. A separate body of water may be maintained in a container in the tank. A pump may be connected in fluid communication with the container and operated under the influence of force transmitted from the handle.

9 Claims, 5 Drawing Sheets

(56) References Cited

U.S. PATENT DOCUMENTS

| | | |
|---|---|---|
| 6,109,294 A | 8/2000 | Ray et al. |
| 6,151,722 A * | 11/2000 | Lubrano .................. 4/225.1 |
| 6,212,699 B1 * | 4/2001 | Tremblay .................. 4/415 |
| 6,260,574 B1 | 7/2001 | Nichols-Roy |
| 6,370,708 B1 * | 4/2002 | Sitarz et al. .................. 4/415 |
| 6,427,719 B1 | 8/2002 | Rodriguez |
| 6,775,859 B1 * | 8/2004 | Gorginians .................. 4/325 |
| 6,880,181 B2 | 4/2005 | Nichols-Roy et al. |
| 6,961,966 B2 * | 11/2005 | Butsch et al. .................. 4/427 |
| 7,007,312 B1 * | 3/2006 | Sim .................. 4/225.1 |
| 7,096,517 B2 * | 8/2006 | Gubeli et al. .................. 4/354 |
| 7,451,777 B2 * | 11/2008 | Burlage et al. .................. 137/1 |
| 2001/0007158 A1 * | 7/2001 | Hubatka et al. .................. 4/354 |
| 2004/0199989 A1 | 10/2004 | Trolio |
| 2007/0101486 A1 | 5/2007 | Torres et al. |
| 2008/0078454 A1 | 4/2008 | Nichols-Roy et al. |

* cited by examiner

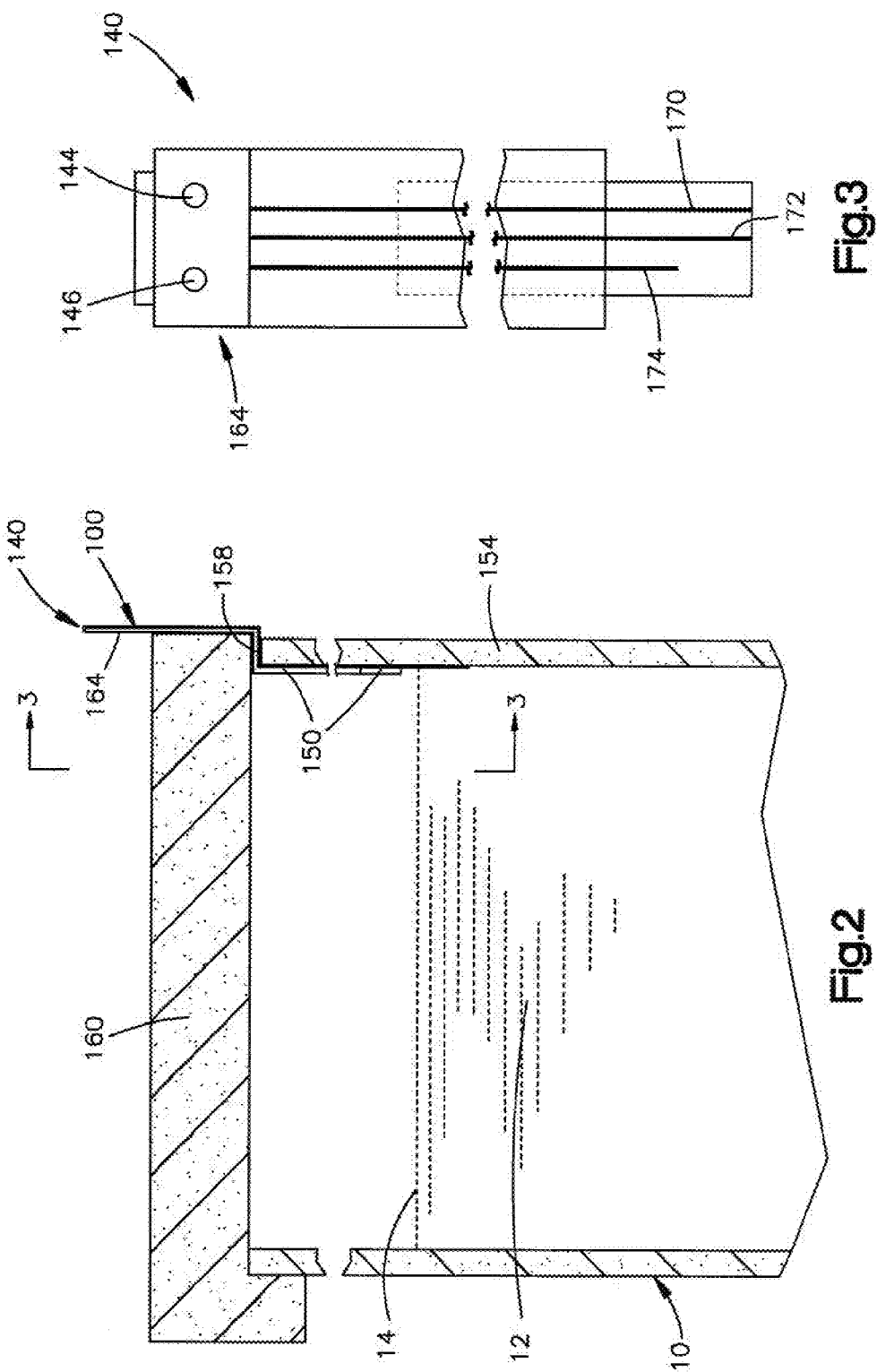

TOILET CONTROLS

RELATED APPLICATION

This application claims the benefit of the filing date of U.S. Provisional Application No. 61/052,732 filed May 13, 2008 and entitled Toilet Controls. The disclosure in the aforementioned U.S. Provisional Application No. 61/052,732 is hereby incorporated herein in its entirety by this reference thereto.

BACKGROUND OF THE INVENTION

The present invention relates to new and improved controls for use in association with a toilet.

Known toilets include a tank which holds a supply of water. When a handle is depressed, water flows from the tank into a toilet bowl. Flow of water into a tank is controlled by a float actuated inlet valve.

When the tank is filled with water to a desired level, the float is effective to cause the inlet valve to be actuated to a closed condition. When the handle is depressed and water flows from the tank into the bowl, the float is lowered in the tank. As the float is lowered, the inlet valve is actuated to an open condition.

When the toilet handle is released, a flapper valve moves from an open position, enabling water to flow from the tank into the toilet bowl, to a closed position, blocking a flow of water into the toilet bowl. At this time, the level of water in the tank will be relatively low and the float actuated inlet valve will be in an open condition. As the amount of water in the tank increases, the float will rise with the water. As this occurs, the float operates the inlet valve from the open condition to a closed condition to block the flow of water into the tank.

It has become increasingly important to conserve water. Toilets may waste water by utilizing an excessive amount of water each time the toilet is flushed. The amount of water required to flush solids is greater than the amount of water required to flush liquids. If the same amount of water is utilized to flush liquids as is utilized to flush solids, water is wasted each time liquids are flushed. In addition, the amount of water required to flush solids differs depending upon the characteristics of the solids. With at least some known toilets, a person utilizing the toilet cannot easily adjust the amount of water which is utilized in flushing the toilet. Therefore, the same amount of water is utilized each time the toilet is flushed with a resulting wasting of water.

If the flapper valve in a known toilet leaks, there will be a continuous flow of water from the tank through the leaking flapper valve. This tends to cause a lowering of the level of water in the tank. The float actuated inlet valve opens to replace the water lost through the leaking flapper valve. Over a period of time, this results in a large quantity of water being wasted through even a slow leak.

If the inlet valve leaks when it is in its closed condition, there is excessive flow of water into the tank. This results in an overflow of water through a standpipe connected in fluid communication with an outlet from the tank.

Various control devices have been associated with the tank of a toilet. Some of these control devices are disclosed in U.S. Pat. Nos. 3,574,867; 3,722,850; 5,421,038; 5,862,537; 6,109,294; and 6,427,719. Other controls which have been associated with the tank of a toilet are disclosed in U.S. Published Patent Application No. 2004/0199989, published Oct. 14, 2004.

SUMMARY OF THE INVENTION

The present invention relates to new and improved controls for use in association with a toilet. The controls enable water to be conserved by allowing a user of the toilet to control the amount of water utilized for each flush of the toilet. The controls enable water to be conserved by minimizing the amount of water lost in the event of either a minor leak or a major leak at one or more components of the toilet.

The controls may be effective to positively actuate a water flow control valve to a closed position when the level of water in a tank of a toilet reaches a desired level. In addition, the controls may detect when the water level in the tank of the toilet is below a desired level and provides an output signal when this occurs. The controls may also detect when the level of water in the tank of the toilet is above a desired level and provides an output signal when this occurs.

A magnet may be utilized to raise a float connected with a water flow control valve of a toilet to positively actuate the valve to a closed condition when the tank in the toilet is filled with water. When the tank of the toilet is to be at least partially emptied to flush the toilet, the float is released by the magnet and moves downwardly with water in the tank as the water is emptied from the tank into a bowl of the toilet. The magnet may advantageously be mounted on a water standpipe in the tank of the toilet.

The controls may also include a water level sensor apparatus. The water level sensor apparatus responds to either too low a level of water in the tank of the toilet or too high a level of water in the tank of the toilet. If the water level in the tank of a toilet is too low, the sensor has an output which indicates the fact that the water level in a tank is too low. Similarly, when the water level in the tank is too high, the sensor has an output which indicates that the water level in the tank is too high.

The controls may include a force transmission assembly which is operable to effect operation of an outlet valve from a closed condition to an open condition under the influence of force transmitted from a toilet handle upon manual actuation of the handle. This force transmission assembly may also be operable to effect operation of an inlet valve from a closed condition to an open condition under the influence of force transmitted from the toilet handle upon actuation of the handle. In addition, the force transmission assembly may be operable to effect operation of the inlet valve from an open condition to a closed condition.

If desired, a separate body of water may be maintained in a container in the tank. A float may be disposed in the container. If the outlet valve leaks, water will flow from the tank. However, since the float engages the separate body of water in the container, the water inlet valve will not open to replenish the water lost from the tank. An inlet valve timer may be operable to effect operation of the inlet valve from the open condition to the closed condition after the inlet valve has been in the open condition for a first period of time.

These controls may include a pump connected in fluid communication with the container and operable under the influence of force transmitted from a manually actuated handle. Operation of the pump induces a flow of water from the container.

The immediately aforementioned controls may also include an outlet valve timer. The outlet valve timer is operable to prevent operation of an outlet valve from an open condition to a closed condition for a second predetermined period of time after the handle has been manually released. This results in the outlet valve remaining in the open condition for a period of time which is equal to the period of time for which the handle is in the actuated condition plus the second predetermined period of time during which the outlet valve timer prevents operation of the outlet valve to the closed condition.

The controls may include a force transmission assembly which is effective to maintain the outlet valve in an open condition as long as a handle is manually held in an actuated position. The force transmission assembly may include an outlet valve timer which prevents operation of the outlet valve from the open condition to a closed condition for a predetermined time after the handle has been manually released. This results in the outlet valve remaining in the open condition for a period of time which is equal to the period of time for which the handle is manually held in the actuated position plus the predetermined period of time during which the outlet valve timer prevents operation of the outlet valve to the closed condition.

The toilet controls of the present invention have many different features. These features may be utilized together in the manner disclosed herein. Alternatively, the features may be utilized separately or in various combinations with each other and/or with features from the prior art. For example, water inlet valve controls having a construction similar to the construction disclosed herein may be used with water outlet valve controls having a construction which is different than the construction disclosed herein. Similarly, water outlet valve controls having a construction similar to the construction disclosed herein may be used with water inlet valve controls having construction which is different than the construction disclosed herein.

BRIEF DESCRIPTION OF THE DRAWINGS

The foregoing and other features of the present invention will become more apparent upon a consideration of the following description taken in connection with the accompanying drawings wherein:

FIG. 2 is a fragmentary schematic illustration, taken generally along the line of 2-2 of FIG. 1, illustrating the manner in which a sensor apparatus may be mounted on the tank of the toilet;

FIG. 3 is a schematic pictorial illustration, taken generally along the line 3-3 of FIG. 2, further illustrating the construction of the sensor apparatus;

DESCRIPTION OF SPECIFIC PREFERRED EMBODIMENTS OF THE INVENTION

Figure 1:
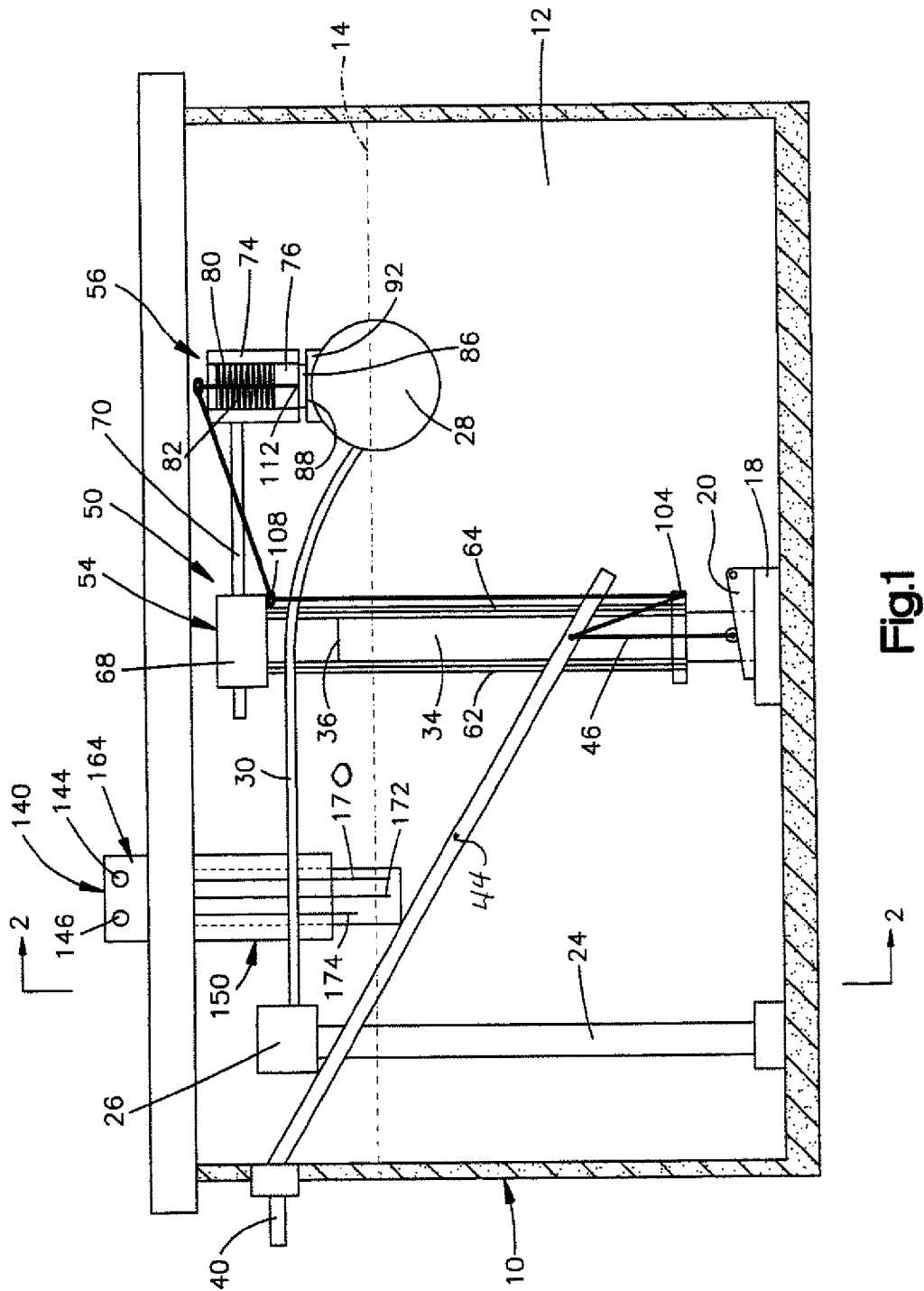
FIG. 1 is a schematic illustration depicting a relationship of controls constructed in accordance with one of the features of the present invention to apparatus in a tank of a toilet.

The toilet control apparatus constructed in accordance with one of the features of the present invention is illustrated schematically in FIG. 1 in association with a tank 10 of a toilet. The tank 10 holds water 12. The desired level of the water 12 in the tank 10 is indicated by a line 14 in FIG. 1. The tank 12 is provided with a water outlet 18 which is normally closed by a flapper valve 20. The water outlet 18 is connected in fluid communication with a bowl of the toilet in a known manner.

Water is conducted to the tank 10 through a water inlet pipe 24. A water flow control valve 26 is provided at an upper end portion of the water inlet pipe 24. The water flow control valve 26 is operated from its normally closed condition to an open condition by downward movement of a float 28 in the tank 10. The float 28 is connected with the water flow control valve 26 by a float arm 30. The float 28 may have any desired configuration. For example, the float 28 may have either a spherical or cylindrical configuration. The illustrated float 28 has a spherical configuration.

A cylindrical standpipe 34 extends upwardly from and is connected in fluid communication with the water outlet 18. If the level of the water in the tank 10 should rise above an upper end 36 of the standpipe 34, water would flow from the tank 10 into the standpipe. This flow of water would be conducted from the standpipe 34 through the outlet 18 into the bowl of the toilet in a known manner.

An actuator handle 40 is pivotally mounted on one side of the tank 10. An actuator arm 44 is fixedly connected with the handle 40 and pivots with the handle relative to the tank 10. The flapper valve 20 is connected to the actuator arm 44 by a suitable connector 46. The connector 46 may be either a wire rod or a flexible chain. Of course, the connector 46 may have a different construction if desired. Although the flapper valve 20 functions as a water outlet valve, it should be understood that the outlet valve may have any desired construction.

The flapper valve 20 includes a chamber which, when the flapper valve is in the closed position illustrated in FIG. 1, it is connected in fluid communication with the water outlet 18 by an opening which is formed in the flapper valve and is surrounded by the water outlet 18. Therefore, when the flapper valve 20 is in the closed position, the chamber in the flapper valve 20 is empty.

When the actuator handle 40 is pivoted relative to the tank 10, the actuator lever 44 pivots in a counterclockwise direction (as viewed in FIG. 1) and the flapper valve 20 is raised by force transmitted through the connector 46. As this occurs, an opening to the chamber in the flapper valve is exposed to the water 12 in the tank 10. As the chamber in the flapper valve fills with water, the water urges the flapper valve 20 to fall downward toward the water outlet 18. The flapper valve 20 has a known construction which may be similar to any one of the flapper valves disclosed in U.S. Patent Publication No. 2004/0237182 published Dec. 2, 2004 and entitled Flapper Valve For a Toilet Tank. Of course, the flapper valve 20 may have a different construction if desired. As was previously mentioned, the water outlet valve may have a construction which is different than the construction of a flapper valve.

In accordance with one of the features of this embodiment of the invention, a control assembly 50 (FIG. 1) is provided to effect positive actuation of the water flow control valve 26 to a closed condition when the level of water 12 in the tank 10 is at the water line 14. The control assembly 50 includes a mounting unit 54 which engages the standpipe 34. In addition, the control assembly 50 includes a float positioning unit 56 which is supported by the mounting unit 54.

The mounting unit 54 includes a pair of support sections 62 and 64 which grip opposite sides of the standpipe 34. Although the support sections 62 and 64 may have many different constructions, in the embodiment of the invention illustrated in FIG. 1, the support sections 62 and 64 have an arcuate cross sectional configuration and form portions of a cylinder The support sections are formed of a polymeric material and are flexible. This enables the support sections to be moved slightly away from each other and to resiliently snap into gripping engagement with the standpipe 34.

The support sections 62 and 64 have arcuate inner side surfaces which grip the cylindrical outer side surface of the standpipe 34. The radius of curvature of the arcuate inner side surfaces of the support sections 62 and 64 is just slightly less than the radius of the cylindrical outer side surface of the standpipe 34. An arcuate inner side surfaces of the support sections 62 and 64 are formed as portions of a common cylinder. This cylinder is enlarged slightly when the support sections 62 and 64 are slipped over the standpipe 34 so that the support sections grip the outer side surface of the standpipe. A cylindrical body 68 is connected to the upper ends of the support sections 62 and 64. The body 68 has a passage through which a support arm 70 extends.

The float positioning unit 56 is mounted on the outer or right (as viewed in FIG. 1) end portion of the support arm 70. The float positioning unit 56 includes a cylindrical case or housing 74 in which a cylindrical piston 76 is disposed. The piston 76 cooperates with the case 74 to form a cylindrical chamber 80 in which a spring 82 is disposed. The spring 82 is effective to urge the piston 76 downwardly (as viewed in FIG. 1) into engagement with a stop ring (not shown) which is fixedly connected to the case 74.

In accordance with one of the features of the embodiment of the invention illustrated in FIG. 1, a magnet 86 is disposed between the piston 76 and a metal disc 88. The metal disc 88 is formed of a ferromagnetic material and is fixedly connected to a support 92. The support 92 is fixedly connected to the float 28.

A flexible line 96 is secured to an end portion 100 of the actuator arm 44. The line 96 extends downwardly (as viewed in FIG. 1) from the actuator arm 44 to an eyelet 104 disposed on the lower end portion of the support section 64. The line 96 extends upward from the eyelet 104 to an eyelet 108 which is fixedly secured to the body 68 and the upper end portion of the support sections 62 and 64. If desired, the eyelets 104 and 108 may be replaced by pulleys. The line extends through the eyelet or pulley 108 to an opening in the case 74. The line 96 extends through the opening in the case 74 and through a passage in the piston 76. An end portion 112 of the flexible line 96 is fixedly connected to the magnet 86.

When the toilet with which the tank 10 is associated is to be flushed, the actuator handle 40 is manually pivoted. This results in the actuator arm 44 pivoting upwardly (as viewed in FIG. 1) with the handle. As this occurs, the connector 46 is raised to move the flapper valve 20 from the closed position illustrated in FIG. 1 to its open position.

As the actuator arm 44 moves upwardly, the end portion 100 of the line 96 also moves upwardly. This results in a tensioning of the line 96 to pull the piston 76 upwardly against the influence of the biasing spring 82. Since the magnet 86 is fixedly connected to the end portion 112 of the line 96, that is, the end portion opposite from the end portion 100, the magnet is pulled upwardly by the line 96. This upward movement of the magnet 86 moves the piston 76 upward into the chamber 80 and compresses the biasing spring 82.

Simultaneously with upward movement of the piston 76, the magnet 86 moves upward into the chamber 80 in the case 74 with the disc 88 being pressed against the lower end portion (as viewed in FIG. 1) of the case 74. Continued upward movement of the piston 76 and magnet 86 under the influence of force transmitted through the line 96 results in the magnet becoming disengaged from the metal disc 88. As this occurs, the float 28 is released for downward movement as the level of water 12 in the tank falls due to the flow of water through the open water outlet 18 into the bowl of the toilet.

As the water 12 is emptied from the tank 10 into the toilet bowl the entrance to a chamber in the flapper valve 20 is exposed to the water 12 and the chamber is at least partially filled with the water. While this is happening, the level of water 12 in the tank 10 is falling. Therefore, the float 28 is moving downwardly (as viewed in FIG. 1). Downward movement of the float 28 actuates the water flow control valve 26 from a closed position to an open position.

When the flow of water through the water outlet 18 into the toilet bowl has been sufficient to flush the toilet, the actuator handle 40 is manually released. This results in the actuator arm 44 pivoting downwardly to the position illustrated in FIG. 1. As the actuator arm 44 moves downwardly to the position illustrated in FIG. 1, the flapper valve 20 is released by the connector 46. When this happens, the flapper valve 20 moves back to the closed position illustrated in FIG. 1. The flapper valve 20 moves to the closed position under the influence of the weight of the water in the chamber of the flapper valve. At the same time, the downward movement of the actuator arm 44 results in the end portion 100 of the line 96 moving downward to reduce the tension in the line.

As the tension in the line 96 is reduced, the spring 82 is effective to move the piston 76 and magnet 86 back to the position illustrated in FIG. 1 relative to the case 74. However, at this time, the float 28 will have moved downwardly in the tank 10 due to the reduction in the quantity of water 12 in the tank. Therefore, the magnet 86 will be spaced a sufficient distance from the metal disc 88 to prevent attraction of the metal disc to the magnet.

Once the handle 40 has been released and the flapper valve closed, the water flowing from the actuated water flow control valve 26 is effective to gradually increase the amount of water 12 in the tank 10. As this occurs, the water line 14 and float 28 move upwardly in the tank 10. Once the tank 10 has been filled to the desired level, the float should cause the water flow control valve 24 to turn off or close. However, the water valve 26 may not completely close.

To completely close the water valve 26, the magnet 86 is effective to attract the metal disc 88 and raise the disc and the float 28 together upward through a relatively short distance. This upward movement of the float causes force to be transmitted from the float arm 30 to the water flow control valve 26. The force transmitted to the water flow control valve 26 is effective positively close the water flow control valve.

If for some unforeseen reason, a leak develops at the flapper valve 20 and/or the water outlet 18, water 12 will slowly drain from the tank 10. As this occurs, the water line 14 will move downward in the tank 10. However, the magnet 86 will attract the disc 88 with sufficient force to hold the float 28 in the raised position illustrated in FIG. 1 as the water level in the tank decreases. Assuming sufficient water 12 has drained through a leak at the flapper 20 and/or water outlet 18, the float 28 may be held above and spaced apart from a body of water remaining in the tank 10. Since the magnet 86 is effective to hold the float 28 upwardly and to apply force to the float pulling it to an upward position in which force is transmitted through the float arm 30 to positively actuate the flow control valve 26 to a closed condition, there is no flow of water even though the volume of water 12 in the tank 10 may be reduced to such a small volume that the water line 14 is adjacent to the flapper valve 20.

Of course, the next time the actuator handle 40 is manually actuated, even though the level of water 12 in the tank 10 is very low, the resulting tension in the line 96 will pull both the piston 76 and magnet 86 upward into the chamber 80. This compresses the spring 82. As this occurs, the disc 88 engages the case 74 and is released from the magnet 86. The float 28 can drop downward in the tank 10.

In the illustrated embodiment of the invention, a disc 88 is attracted by the magnet 86. If desired, a second magnet may be substituted for the disc 88. The polarity of the magnets would be such that they would attract each other. This magnetic attraction may be utilized to align the case 74 with the float during installation of the control assembly 60.

A water level sensor assembly 140, constructed in accordance with one of the features of the present invention, is illustrated in FIGS. 1-3. The water level sensor assembly 140 provides an output when the water line 14 is below a predetermined level. The water level sensor assembly 140 also provides an output when the water line 14 is above a predetermined level.

Although the water level sensor assembly 140 may have many different types of outputs in response to the water line 14 being either above a predetermined level or below a predetermined level, in the illustrated embodiment of the water level sensor assembly 140, a visual output is provided. When the water line 14 drops to a predetermined low level, a red light 144 is energized. Therefore, energization of the red light 144 provides an indication that there is a leak from the tank 10. For example, the leak may occur at the flapper valve 20 and/or the water outlet 18.

When the water line 14 is above a predetermined level, a green light 146 is energized (see FIGS. 1 and 3). Therefore, energization of the green light 146 provides an indication that there is excessive flow of water into the tank 12. This excessive flow of water may be the result of a leak at the water flow control valve 26. An audible alarm may be associated with the green light 146 and/or red light 144 if desired.

The water level sensor assembly 140 may be mounted on the tank of the toilet in the manner illustrated schematically in FIG. 2. A water level sensing portion 150 of the water level sensor assembly 100 is disposed in the tank 10 along a rear side wall 154 of the tank. A retaining portion 158 of the water level sensor assembly 100 is clamped between the rear side wall 154 of the tank 10 and a lid 160 of the tank. An indicator portion 164 is disposed above the lid 160. The retaining portion 158 is securely clamped between the rear side wall 154 of the tank 10 and the lid 160 to hold the water level sensor assembly 140 in a desired position relative to the tank 10 and the lid 160.

The water level sensor assembly 140 includes three electrodes 170, 172, and 174 (FIG. 3). When the water line 14 is at or above a predetermined level, the electrodes 170 and 172 are engaged by the water 12 in the manner indicated schematically in FIG. 1. A circuit is completed through the water 12 between the two electrodes 170 and 172. The completion of this circuit results in energization of the red indicator light 144. If desired, the three electrodes 170-174 may be disposed within three tubes.

If the water level in the tank 10 rises by an amount so that the water line 14 is just below the upper end 36 of the standpipe 34, the water engages the electrode 174. Of course, the water also engages the electrodes 170 and 172 when the water 12 engages the electrode 174. When this occurs, a circuit is completed to effect energization of the green light 146.

Figure 4:
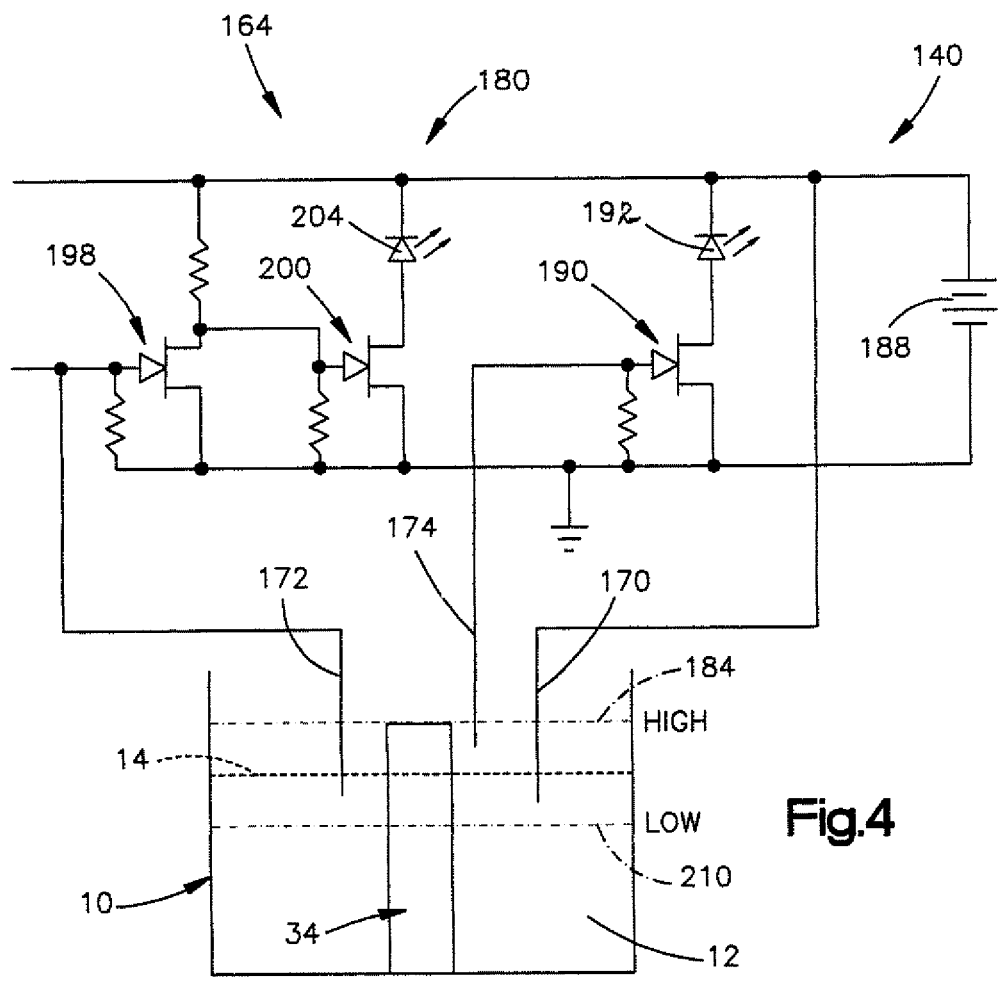
FIG. 4 is a schematic illustration of circuitry used in association with the sensor apparatus of FIG. 3.

The indicator portion 164 of the water level sensor assembly 140 includes electrical circuitry 180 (FIG. 4). The electrical circuitry 180 is connected with the electrodes 170, 172 and 174. The electrical circuitry 180 is disposed in the indicator portion 164 of the water level sensor assembly 140 and may be positioned above the tank 10 in the manner illustrated in FIG. 1. The electrodes 170, 172 and 174 may be mounted on the tank 10 in the same manner illustrated in FIG. 1.

When the level of the water in the tank 10 is relatively high, in the manner indicated in dashed lines at 184 in FIG. 4, both the electrode 170 and the electrode 174 are disposed in the water 12 of the tank 10. This enables a high output to be conducted from the battery 188 through the electrode 170 and water 12 to the electrode 174. The electrode 174 is connected to the input to a transistor 190. This biases the transistor 190 so that it is conducting. When the transistor 190 is conducting, a red light emitting diode 192 is energized. Energization of the red light emitting diode 192 results in an output signal at the red light 144 (FIG. 1) to indicate that the level of water in the tank 10 is above a desired level.

When the level of water in the tank 10 is relatively high, for example, at the level 184 of FIG. 4, a high signal is provided at the input to a transistor 198. This high signal is conducted from the battery, through the electrode 170 and water 12 to the electrode 172. This renders the transistor 198 conducting. When the transistor 198 is conducting, there is a low output signal on the input to a third transistor 200. The low signal to the input to the third transistor 200 results in a second or green light emitting diode being in a deenergized condition. Therefore, at this time, there is no visual signal at the green light 146 (FIG. 1).

When the water level in the tank 10 drops to a relatively low water level, indicated schematically at 210 in FIG. 4, all three of the electrodes 170, 172 and 174 are spaced from the water 12. Therefore, the circuit between the electrode 170 and electrode 172 through the water 12 is interrupted and the transistor 198 is rendered nonconducting. When the transistor 198 is nonconducting, the battery 188 provides a high or positive bias to the input to the transistor 200. This renders the transistor 200 conducting so that the green LED 204 is energized. This results in the green light 146 (FIG. 1) on the water level sensor assembly 140 being energized to provide a visual signal that the water level is low.

Figure 5:
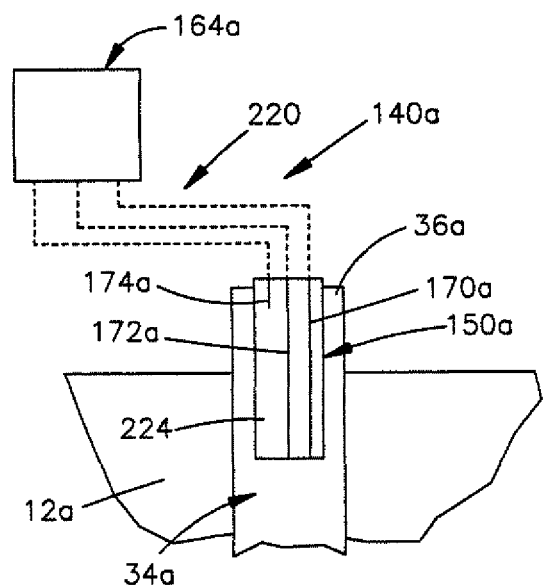
FIG. 5 is a schematic illustration of the manner in which a portion of the sensor apparatus of FIG. 3 may be mounted on an upper end portion of a standpipe in the tank.

In the embodiments of the invention illustrated in FIGS. 1-4, the water level sensor assembly 140 is illustrated as being mounted in association with the tank 10. In the embodiment of the invention illustrated in FIG. 5, the water level sensor assembly is mounted in association with the standpipe. Since the embodiment of the invention illustrated in FIG. 5 is generally similar to the embodiment of the invention illustrated in FIGS. 1-4, similar numerals will be utilized to designate similar components. The suffix letter "a" being associated with the numerals of FIG. 5 to avoid confusion.

A water level sensor assembly 140a includes water level sensing portion 150a and a indicator portion 164a and extends into the water 12a. The water level sensing portion 150a is mounted on the upper end portion 36a of the standpipe 34a. The indicator portion 164a is connected with the water level sensing portion 150a by conductors 220 which may be disposed in a suitable cable.

The water level sensing portion 150a includes electrodes 170a, 172a, and 174a corresponding to the electrodes 170-174 of FIGS. 3 and 4. The indicator portion 164a has the same general construction as the indicator portion 164 of FIG. 4. The conductors 220 connect the electrodes 170a, 172a and 174a with electrical circuitry, corresponding to the electrical circuitry 180 of FIG. 4, in the indicator portion 164a.

In accordance with a feature of the embodiment of the invention illustrated in FIG. 5, the water level sensing portion 150a is disposed on the backing or support 124 which is connected to the standpipe 34a. The backing or support 124 extends over the upper end portion 36a into an opening within the standpipe 34a to connect the water level sensing portion 150a with the standpipe 34a. Of course, the water level sensing portion 150a may be connected with the standpipe 34a in a different manner if desired. For example, suitable fasteners may be provided to secure the support 224 to the standpipe.

Figure 6:
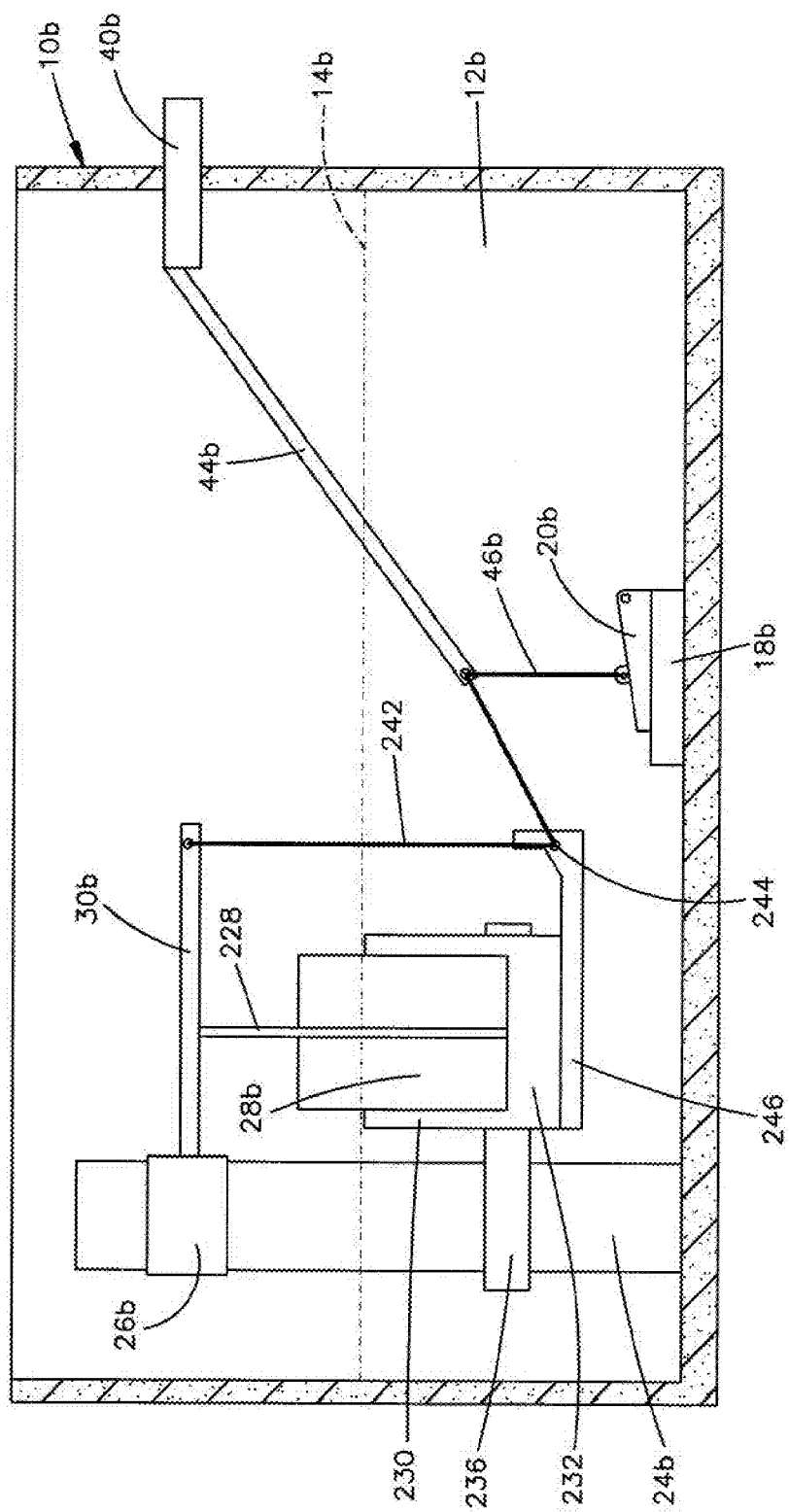
FIG. 6 is a schematic illustration depicting a second embodiment of controls constructed in accordance with features of the present invention.

In the embodiment of the invention illustrated in FIGS. 1-5, the float 28 engages the body of water 12 in the tank 10. In the embodiment of the invention illustrated in FIG. 6, the float engages a body of water which is separate from the body of water in the tank 10. Since the embodiment of the invention illustrated in FIG. 6 is generally similar to the embodiments of the invention illustrated in FIGS. 1-5, similar numerals will be utilized to designate similar components, the suffix letter "b" being associated with the numerals of FIG. 6 to avoid confusion.

A toilet includes a main tank 10b which holds water 12b. The water 12b fills the tank 10b to a water line 14b. A water outlet 18b from the tank 10b is closed by a flapper valve 20b. When the flapper valve 20b is in the closed condition illustrated in FIG. 6, the flapper valve blocks fluid flow through the water outlet 18b. The valve for the outlet 18b may have a construction other than the well known flapper valve construction.

Water is conducted to the tank 10b through a water inlet pipe 24b. A water flow control valve 26b controls the flow of water through the water inlet pipe 24b. The water flow control valve 26b may be referred to as an inlet valve. The water flow control valve 26b is connected with a float 28b by a float arm 30b and a rigid connector link 228. The connector link 228 is pivotally connected to the float arm 306.

The float 28b has a cylindrical configuration and is hollow. The float 28b is sealed and contains air so that the float 28b is buoyant in water. It should be understood that the float 28b may be constructed in a different manner if desired. For example, the float 28b may be formed by a solid cylindrical piece of closed cell polymeric foam.

In accordance with one of the features of the embodiment of the invention illustrated in FIG. 6, the float 28b is disposed in a container 230. The container 230 has a cylindrical configuration corresponding to the cylindrical configuration of the float 28b. However, the container has a diameter which is greater than the diameter of the float 28b. This enables the float 28b to move vertically in the container 230 upon of variations of the level of water in the container.

The container 230 holds a body 232 of water which is separate from the body of water 12b which fills the tank 10b. The container 230 is fixedly connected to the water inlet pipe 24b by a mounting bracket 236. The mounting bracket 236 extends around both the water inlet pipe 24 and the container 230.

When the level of the water 12b in the tank 10b is reduced by movement of the flapper valve 20b to an open condition, the container 230 remains stationary relative to the tank 10b. Water may be forced from the container 230 as the float 28b is forced downward in the container 230 by the float arm 30b. When the level of water in the tank 12b reaches the water line 14b during refilling of the tank 10b, the water flows over the top of the container 230 to replace the water forced from the container by downward movement of the float 28b with the float arm 30b.

Actuator handle 40b on the tank 10b is connected with the flapper valve 20b by a flexible line 46b. If desired, a linkage arrangement may be utilized in place of the flexible line 46b to interconnect an actuator arm 44b and the flapper valve 20b. The actuator arm 44b is fixedly secured to the handle 40b.

A second flexible line 242 connects the actuator arm 44b to the float arm 30b. On actuation of the handle 40b, the actuator arm 44b is pivoted in a clockwise direction, as viewed in FIG. 6, and tensions the line 242. The line 242 extends through an eyelet 244 mounted on a base 246 connected to the container 230. The upper (as viewed in FIG. 6) end portion of the flexible line 242 is connected to the float arm 30b.

Upon actuation of the handle 40b and clockwise rotation of the actuator arm 44b, tensioning of the line 242 is effective to pull the float arm 30b downward (as viewed in FIG. 6) against the buoyancy of the float 28b. As this occurs, the float 28b moves further into the container 230. As this occurs, water is expelled from the container 230 into the body of water 12b in the tank 10b.

At the same time that the float arm 30b and float 28b are pulled downward (as viewed in FIG. 6) by movement of the actuator arm 44b and tension in the line 242, the flapper valve 20b is pulled to the open condition by tension in the line 46b. This results in a flow of water 12b from the tank 10b through the open water outlet 18b into a bowl of the toilet.

As the water flows from the tank 10b through the open flapper valve 20b and water outlet 18b, the level of water 12b in the tank is reduced. However, the float 28b is pushed downward toward the bottom of the container 230 by force transmitted from the actuator arm 44b through the line 242 to the float arm 30b. This force is transmitted from the float arm 30b to the float 28b through the rigid connector link 230.

When the tank 10b has been substantially emptied of water 12b, the handle 40b is released. When this occurs, the float 28b will move slightly upwardly in the container 230. However, the distance which the float 28b moves upward in the container 230 will not, at this time, be sufficient to actuate the water flow control valve 26b to a closed condition. Therefore, water will keep flowing into the tank 10b.

As water flows into the tank 10b, the float 28b will remain substantially stationary in the container 230. This is because of the relatively small volume, at this time, of water in the container 230 is separate from the volume of water in the tank 10b. Therefore, as the tank 10b fills with water, the amount of water in the container 230 remains constant and the float 28b does not move upward as the volume of water in the tank 10b increases.

Eventually, the tank 10b will fill with water to the water line 14b. The water line 14b is aligned with the top of the container 230. Therefore, the water will flow over the upper end of the container 230. As this occurs, the volume of the body 232 of water in the container 230 will increase and the float 28b will move upward. As the float 28b moves upward, force is transmitted through the rigid connector link 228 to the float arm 30b.

When the level of water in the container 230 is close to but slightly below the water line 14b, the force transmitted through the connector link 228 will cause the float arm 30b to actuate the intake valve 26b to a closed position. Therefore, the water flow control valve 26b is closed and water stops flowing into the tank 10b when the level of water in the container 230 is slightly below the water line 14b. The water line 14b is at the same level as the upper edge of the container 230.

If a leak develops at the flapper valve 20b, the volume of water 12b in the tank 10b will be reduced and the level of the water will move below the water line 14b. As this occurs, the float 28b remains stationary relative to the tank 10b. This is because the body 232 of water in the container 230 is separate from the body of water 12b in the tank 10b. Therefore, as the volume of water in the tank 10b is reduced through the leaking flapper valve 20b, the water flow control valve 26b remains closed. This results in a maximum of amount of water which can be lost due to a leaking flapper valve 20b being equal to the volume of water disposed in the tank 10b outside of the container 230.

It should be understood that the water level sensor assembly 140 may be associated with the apparatus of FIG. 6 if desired. The water level sensor assembly 140 may be mounted on the tank in the manner illustrated in FIGS. 1 and 2. Alternatively, the water level sensor apparatus may be mounted on the standpipe in the manner illustrated schematically in FIG. 5. It should also be understood that the various features of the present invention may be used together, as disclosed herein. Alternatively, the features may be used separately or in various other combinations with each other and/or the prior art.

Figure 7:
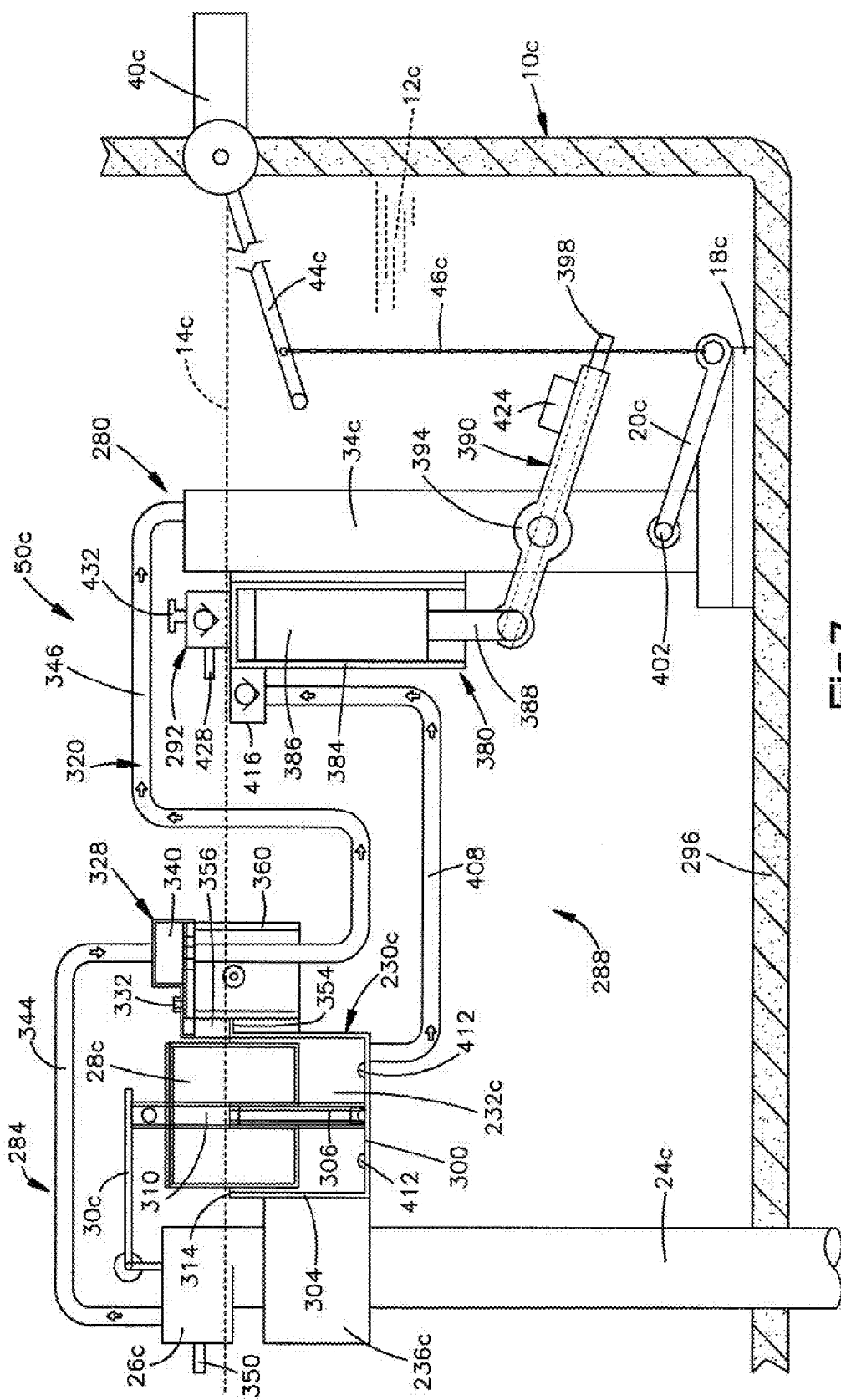
FIG. 7 is a schematic illustration of a third embodiment of controls constructed in accordance with features of the present invention.

The embodiment of the invention illustrated in FIG. 7 is generally similar to the embodiments of the invention illustrated in FIGS. 1-6. Therefore, similar numerals will be utilized to designate similar components, the suffix letter "c" being associated with the numerals of FIG. 7 to avoid confusion. It should be understood that features of the embodiment of the invention illustrated in FIGS. 1-6 may be used with the embodiment of FIG. 7.

In the embodiment of the invention illustrated in FIG. 7, a handle 40c is manually actuatable to vary the length of time for which an outlet valve 20c is open. This enables the duration of a flush to be varied. If solids are to be flushed, an individual utilizing the toilet illustrated schematically in FIG. 7 would manually actuate the handle 40c and hold the handle in an actuated condition for a desired length of time. After this desired length of time has passed, the handle 40c would be released.

In addition to the length of time for which the handle 40c is held in the actuated condition, the outlet valve 20c is held open for a length of time determined by water outlet valve controls 280. This results in the outlet valve 20c being in an open condition for a length of time for which the handle 40c is manually held in an actuated condition plus the length of time determined by the water outlet controls 280.

It is contemplated that if liquids are to be flushed, the handle 40c may be actuated and then immediately released. If this is done, the outlet valve 20c would be in the open condition for the period of time determined by the water outlet valve controls 280. Thus, upon manual actuation of a handle 40c the outlet valve 20c would be operated to its open condition. The handle 40c would then be manually released. The outlet valve 20c would remain in the open condition until a period of time determined by the water outlet valve controls 280 has elapsed.

In addition to the water outlet valve controls 280, the control assembly 50c (FIG. 7) includes water inlet valve controls 284. The water inlet valve controls 284 control a flow of water into a main tank 10c of the toilet. The water inlet valve controls 284 are effective to maintain a level of water 12c in the main tank 10c so that the water line is normally the level indicated by a dashed line 14c. In the event of a minor or slow leak from the main tank 10c through the outlet valve 20c to the bowl of the toilet, the water inlet valve controls 284 would maintain the water flow control or inlet valve 26c in a closed condition so that, at most, only the water in the main tank 10c would be lost (wasted). In the event of a large or major leak from the tank 10c, caused by failure of one or more components of the toilet, the water inlet valve controls 284 would still limit the amount of water which is lost (wasted) to the amount of water disposed in the main tank.

The water inlet valve controls 284 and the water outlet valve controls 280 (FIG. 7) are connected with the handle 40c by a force transmission assembly 288. The force transmission assembly 288 is operable to effect operation of the water outlet valve 20c from a closed condition to an open condition under the influence of force transmitted from the handle 40c upon manual actuation of the handle. In addition, the force transmission assembly 288 is operable to effect operation of the inlet valve 26c from a closed condition to an open condition under the influence of force transmitted from the handle 40c upon manual actuation of the handle. The force transmission assembly 288 is also operable to effect operation of the inlet valve 26c from the open condition to a closed condition.

The force transmission assembly 288 maintains the outlet valve 20c in an open condition as long as the handle 40c is manually held in an actuated position. The force transmission assembly 288 includes an outlet valve timer 292 which prevents operation of the outlet valve 20c from the open condition to the closed condition for a predetermined period of time after the handle 40c has been manually released and has moved to an unactuated position. Therefore, the outlet valve 20c remains in the open condition for a period of time for which the handle 40c is manually held in the actuated position plus the predetermined period of time during which the outlet valve timer 292 prevents operation of the outlet valve to the closed condition.

The water inlet valve controls 284 are connected with the water inlet valve 26c and form part of the force transmission assembly 288. The water inlet valve controls 284 include a container 230c which is mounted above a bottom 296 of the tank 10c by a mounting bracket 236c connected with a water inlet pipe 24c.

The container 230c is supported on the water inlet pipe 24c with a circular bottom wall 300 of the container 230c above the outlet valve 20c and below the inlet valve 26c. The bottom wall 300 of the container 230c extends generally parallel to the bottom wall 296 of the tank 10c. A float 28c is disposed in the container 230c. The float 28c engages a body of water 232c disposed in the container 230c.

The float 28c has a cylindrical configuration with an outside diameter which is smaller than an inside diameter of a cylindrical side wall 304 of the container 230c. A cylindrical guide member 306 is fixedly connected to the bottom wall 300 of the container 230c and extends upwardly into a cylindrical opening 310 in the float 28c. The guide member 306 cooperates with the float 28c to maintain the float in a coaxial relationship with the side wall 304 of the container 230c during movement of the float relative to the container 230c with variations in the quantity of water in the body 232c of water in the container. It should be understood that the container 230c and float 28c may have a configuration which is different than the previously described cylindrical configuration. For example, the float and container may have polygonal configurations.

The float 28c is connected with the water inlet valve 26c by a rigid float arm 30c. When the body 232c of water in the container 230c extends upward to a circular upper rim 314 of the container 230c, the float 28c is held in a partially submerged condition in the body 232c of water by the float arm 30c. At this time, upward force applied against the float arm 30c by the float 28c is more than sufficient to maintain the inlet valve 26c in a closed condition. Thus, force transmitted from the float 28c through the rigid float arm 30c to the inlet valve 26c biases the inlet valve to a closed condition so that the inlet valve is tightly closed.

Assuming normal operation of the inlet valve 26c, there is no leakage of water from the conduit or water inlet pipe 24c through the closed water inlet valve 26c. Of course, water is maintained, under pressure, in the water inlet pipe 24c and this fluid pressure is transmitted to the water inlet valve 26c. However, the biasing force transmitted from the float 28c through the float arm 30c maintains the water inlet valve 26c in a securely closed condition. The general manner in which the float 28c cooperates with the water inlet valve 26c is the same as was previously described in conjunction with the embodiment of FIG. 6.

When the handle 40c is manually actuated, the force transmission assembly 288 effects operation of the inlet valve 26c to an open condition. To effect operation of the inlet valve 26c to an open condition, water is removed from the body of water 232c in the container 230c. The removal of water from the container 230c results in the float 28c moving downward in the container 230c toward the bottom wall 300 of the container. The guide member 306 cooperates with the float 28c to guide this downward movement of the float.

As the float 28c moves downward in the container 230c, the water inlet valve 26c is operated to an open condition. As this occurs, water is conducted through a conduit 320 (FIG. 7) to a stand pipe 34c which is connected in fluid communication with the toilet bowl through the bottom wall 296 of the tank 10c in a known manner. It should be understood that it is the change in the level or quantity of water in the container 230c which effects downward movement of the float 28c and actuation of the water inlet valve 26c from the closed condition to the open condition.

At this time, the outlet valve 20c will have been moved from the closed condition to an open condition by manual actuation of the handle 40c. Therefore, water 12c will flow from the tank 10c through the open outlet valve 20c into the toilet bowl. This results in downward movement of the water line 14c. The downward movement of the water line 14c does not affect the level of water in the container 230c. This is because the body of water 232c in the container 230c is separate from the water 12c held by the main tank 10c.

An inlet valve timer 328 is operable to effect operation of the inlet valve 26c from the open condition to a closed condition after the inlet valve has been in the open condition for a predetermined period of time. This predetermined period of time is more than sufficient to enable a flow of water conducted from the open inlet valve 26c to the tank 10c to replace the water which has been conducted from the main tank to the toilet bowl during a normal flushing action. Thus, the inlet valve timer 328 is operable to effect operation of the inlet valve 26c from the open condition to the closed condition when a predetermined time after initial manual actuation of the handle 40c has elapsed. This predetermined period of time is more than sufficient to enable an entire body of water 12c held in the main tank 10c to be replaced by a flow of water from the water inlet valve 26c after closing of the outlet valve 20c.

As an example, it may be assumed that a period of time of one minute or less is required for a complete maximum flushing action. During a maximum flushing action, the outlet valve 20c is manually held in the open condition for a period of time sufficient to enable all of the water 14c from the main tank 12c to flow through the open outlet valve 20c into the toilet bowl. Additional time is required to enable water to flow from the inlet valve 26c into the main tank 10c after the outlet valve 20c has closed. Assuming the foregoing elapsed time from initiating a flushing action by actuating the handle 40c to filling the tank 10c to the water line 14c is approximately one minute or less, the inlet valve timer would effect operation of the inlet valve 26c from the open condition to the closed condition after the inlet valve had been in the open condition for approximately one minute. However, the water inlet valve controls 284 may close the inlet valve 26c before the one minute time period elapses.

In the foregoing specific example, the inlet valve 26c would be operated to the open condition in response to actuation of the handle 40c and a flow of water from the container 230c. If for some unforeseen reason, the water outlet valve controls 280 malfunction or if a major (large) leak occurs from the main tank 10c, the inlet valve timer 328 would effect operation of the water inlet valve 26c from the open condition to the closed condition after the water inlet valve had been in the open condition for one minute. It should be understood that the aforementioned example in which the inlet valve timer 328 is effective to maintain the water inlet valve 26c in the open condition for a period of one minute is only an example. It is contemplated that the inlet valve timer 328 may be set to have the inlet valve 26c open for any desired length of time. An adjustment screw 332 is provided on the inlet valve timer 328 to enable the timer to be adjusted to maintain the inlet valve 26c in the open condition for any desired length of time.

It is contemplated that, during normal operation of the toilet, the water inlet valve 26c will have been operated to the closed condition before a period of time determined by the inlet valve timer 328 has elapsed. Thus, in the foregoing example, the water inlet valve 26c would normally be operated to the closed condition before the one minute time period has elapsed. During normal operation of the controls 50c, the inlet valve 26c closes before the time period determined by the inlet valve timer 328 has elapsed.

During normal operation of the toilet, the handle 40c will be released and, after a short time, the outlet valve 20c will close. The flow of water from the inlet valve 26c will then be held in the main tank 10c. This will result in a raising of the water line 14c as the quantity of water 12c in the main tank 10c increases. As the water line 14c moves upwardly in the main tank 10c, the water line will reach a level which is just above the rim or upper edge of the container 230c. This will result in the container 230c being quickly filled with water and the float 28c being raised to effect operation of the water inlet valve 26c to the closed condition under the influence of force transmitted from the float through the float arm 30c to the inlet valve 26c. Thus, during normal operation of the toilet, the inlet valve timer 328 does not effect operation of the inlet valve 26c. It is only if there is a failure of one or more components of the toilet to function in the normal manner that the inlet valve timer 328 effects operation of the inlet valve 26c to the closed condition.

A major leak or a catastrophic failure of one or more components of the toilet may result in a failure of the main tank 10c to fill with water 12c. Therefore, in the event of a catastrophic failure of one or more components of the toilet, the water inlet valve controls 284 are effective to operate the inlet valve 26c to a closed condition after a period of time determined by the inlet valve timer 328 has elapsed. This is effective to minimize the amount of water which is wasted as a result of the catastrophic failure of one more components of the toilet.

In the event of a slow leak after the main tank 10c has been filled with water 12c to the water line 14c, the water inlet valve controls 284 will limit the volume of amount of water which is lost through the slow leak. The water inlet valve controls 284 will limit the lost water to the volume of water 12c held in the main tank 10c. As the water 12c gradually flows from the main tank 10c through the slow leak, the water line 14c will move downward in the main tank 10c. However, the body 232c of water in the container 230c will not be effected by this loss of water from the main tank 10c. Therefore, the float 28c will continue to apply a biasing force against the float arm 30c to hold the water inlet valve 26c in a tightly closed condition as water slowly leaks from the main tank 10c. Therefore, the amount of water which can be lost through a slow leak from the tank 10c is only the quantity of water 12c held by the tank 10c outside of the container 230c.

The inlet valve timer 328 includes a timer chamber 340. A length 344 of the conduit 320 extends from the water inlet valve 26c to the timer chamber 340. A second length 346 of conduit extends from the timer chamber 340 to the stand pipe 34c. Most of the flow of water through the inlet valve 26c is directed into the body of water 12c in the tank 10c through an outlet 350. A smaller portion of the flow of water through the inlet valve 26c is directed to the length of conduit 344.

Most of the water which flows from the inlet valve 26c through the length 344 of conduit is conducted through the timer chamber 340 to the conduit 346 and flows through the stand pipe 34c into the toilet bowl. However, a portion of the water conducted through the length 344 of conduit is directed from the timer chamber 340 into the container 230c. A rectangular lip 354 on the rim 14 of the container 230c extends into a groove 356 formed in the outside of a support 360 for the inlet valve timer 328. The support 360 is fixedly connected with the container 230c and water inlet pipe 24c.

The water directed into the groove 356 from the timer chamber 340 flows across the lip 354 into the container 230c. The water which flows across the lip 354 into the container 230c forms part of the body 232c of water in the container. The rate of flow of water from the timer chamber 340 to the container 230c through the groove 356 and across the small lip 354 is controlled by an adjusting the screw 332. The rate of flow of water through the groove 356 is very slow so that the container 230c slowly fills with water directed from the timer chamber 340.

The screw 332 can be turned to vary the size of an opening through which water flows from the timer chamber 340 into the container 230c. The screw 332 is connected to a needle valve through which water is conducted form the chamber 340 through the groove 356 to the lip 354 on the rim 314 of the container 230c. Alternatively, the screw 332 may engage a flexible member which, when the screw is turned, is resiliently deflected to vary the size of an opening through which water flows from the timer chamber into the container 230c. As another example, the screw 332 may engage an internally threaded member connected to a movable flow control member.

During normal operation of the toilet controls 50c, the rate of flow of water from the timer chamber 340 to the container 230 is so slow that the main tank 10c is filled with water 12c to the water line 14c before the quantity of water in the body 232c of water is sufficient to move the float 28c upward and actuate the inlet valve 26c to a closed condition. Therefore, the container 230c is normally filled with a flow of water over the rim 314 of the container 230c when the water line 14c reaches a level which is just slightly above the rim 314 of the container. It is this flow of water over the rim 314 of the container 230c is normally effective to raise the float 28c to a level sufficient to effect closing of the inlet valve 26c.

The water outlet valve controls 280 control operation of the outlet valve 20c. The water outlet valve controls 280 are effective to delay closing of the water outlet valve 20c for a predetermined time period after the handle 40c has been manually released and has moved from an actuated condition to an unactuated condition. In addition, the water outlet valve controls 280 are operable to withdraw water from the container 230c in the water inlet valve controls 284 to initiate operation of the water inlet valve 26c to the open condition in response to manual actuation of the handle 40c.

Both the water outlet valve controls 280 and the water inlet valve controls 284 form part of the force transmission assembly 288 and are connected with the handle 40c. The handle 40c is connected with the outlet valve 20c by an actuator arm 44c and a flexible connector element 46c. In the illustrated embodiment, the flexible connector element 46c is a chain. However, the flexible connector element 46c may have a different construction if desired. For example, the flexible connector element 46c may be formed by a spring. If desired, the connector element 46c may be formed by one or more rigid links. Thus, it is contemplated that one or more rigid links could extend from the outlet valve 20c to the actuator arm 46c.

When the handle 40c is manually actuated, the actuator arm 44c is pivoted in a clockwise direction (as viewed in FIG. 7) and pulls the flexible connector element 46c upward. This upward movement of the flexible connector element 46c operates the outlet valve 20c from a closed condition to an open condition. Opening of the outlet valve 20c enables water in the body 12c of water in the main tank 10c to flow through a water outlet 18c into the toilet bowl.

When the handle 40c is manually actuated, the force transmission assembly 288 transmits force from the handle 40c to a pump assembly 380 which forms part of the force transmission assembly. The force transmitted from the handle 40c to the pump assembly 380 is effective to operate the pump assembly. Operation of the pump assembly 380 is effective to induce a flow of water from the container 230c. The flow of water from the container 230c results in a lowering of the float 28c in the container 230c. Lowering of the float 28c causes operation of the water inlet valve 26c from the closed condition to the open condition.

Operation of the pump assembly 380 effects operation of the inlet valve 26c to the open condition contemporaneously with operation of the outlet valve 20c to the open condition. In addition, the pump assembly 380 cooperates with the outlet valve timer 292 to prevent operation of the outlet valve 20c from the open condition to a closed condition until after the handle 40c is manually released and has returned to an unactuated condition.

The pump assembly 380 includes a cylinder 384 in which a cylindrical piston 386 is disposed. The cylinder 384 is fixedly connected to the stand pipe 34c. A piston rod 388 has an upper end portion which is pivotally connected with the piston 386. In addition, the piston rod has a lower end portion which is pivotally connected with a rocker arm 390.

A central portion 394 of the rocker arm 390 is pivotally mounted on the stand pipe 34c. An end portion 398 of the rocker arm 390 is connected with the flexible connector element 46c. The distance between end portion 398 of the rocker arm 390 and the connection of the flexible connector element to the outlet valve 20 remains constant.

Upon manual actuation of the handle 40c, the actuator arm 44c pivots upwardly. This upward movement of the actuator arm 44c pulls the flexible connector 46c upward. As the flexible connector element 46c is pulled upward, the outlet valve 20c is pivoted in a counterclockwise direction about a pivot connection 402. As this occurs, the outlet valve 20c swings upward to an open condition.

At the same time that the outlet valve 20c is opened under the influence of force transmitted from the handle 40c through the actuator arm 44c and flexible connector element 46c, the pump assembly 380 is actuated under the influence of force transmitted from the handle 40c. To actuate the pump assembly 380, upward movement of the actuator arm 44c is effective to pivot the rocker arm 390 in a counterclockwise direction about the central portion 394 of the rocker arm at a pivot connection with the stand pipe 34c. As this occurs, the piston rod 388 is pulled downward to move the piston 386 downward in the cylinder 384. Thus, force is transmitted from the handle 40c through the flexible connector element 46c of the force transmission assembly 288 to both the outlet valve 20c and the rocker arm 390. This force effects operation of the outlet valve 20c to an open condition and effects downward movement of the piston 386 in the cylinder 384 of the pump assembly 380.

Operation of the pump assembly 380 under the influence of force transmitted from the handle 40c is effective to induce a flow of water from the container 230c to the pump assembly. This flow of water from the container 230c to the pump assembly 380 results in the float 28c moving downward in the container 230c. This operates the water inlet valve 26c from the closed condition to the open condition under the influence of force transmitted from the float 28c through the float arm 30c to the water inlet valve. The quantity of water which is withdrawn from the container 230c through the conduit 408 is sufficient to enable the float 28c to move downward to a position closely adjacent to the bottom wall 300 of the container 230c. Downward movement of the float 28c is limited by stops 412 connected to the bottom wall 300 of the container 230c.

The water from the conduit 408 flows through a check valve assembly 416 into the head end portion of the cylinder 384 of the pump assembly 380. The downward movement of the piston 386 under the influence of force transmitted from the handle 40c is effective to suck the water from the container 230c through the conduit 408 and check valve assembly 416 into the cylinder 384. The quantity of water sucked from the container 230c is at least as great as is required to effect downward movement of the float 28c through a distance sufficient to operate the inlet valve 26c to its open condition.

As was previously mentioned, the outlet valve timer 292 prevents operation of the outlet valve 20c from the open condition to the closed condition for a predetermined time period after the handle 40c is manually released. Thus, when the handle 40c is manually released, the actuator arm 44c pivots in a counterclockwise direction, that is downward as viewed in FIG. 7. This results in slack being formed in the upper portion of the flexible connector element 46c. However, at this time, the pump assembly 380 is effective to hold the rocker arm 390 against pivotal movement relative to the stand pipe 34c. Therefore, tension is maintained in the lower (as viewed in FIG. 7) portion of the flexible connector element 46c and the outlet valve 20c is maintained in the open condition.

A weight 424 on the rocker arm 390 is effective to urge the rocker arm back toward the unactuated condition shown in FIG. 7. Thus, a biasing force is applied to the rocker arm 390 urging the rocker arm to pivot in a clockwise direction about the central portion 394 of the rocker arm. This force urges the piston 386 upwardly (as viewed in FIG. 7) in the cylinder 384. The upward biasing force applied against the rocker arm by the weight 424 causes the piston 386 to pressurize the water disposed above the piston in the cylinder 384. If desired, a spring may be utilized to apply the biasing force to the rocker arm 390.

The outlet valve timer 292 is connected in fluid communication with the head end portion of the cylinder chamber in the cylinder 384. Therefore, water flows from the cylinder 384 through the outlet valve timer 292 to a water discharge outlet 428. Water conducted to the discharge outlet 428 forms part of the water 12c in the main tank 10c.

The outlet valve timer 292 includes a check valve assembly. An adjustment screw 432 is manually actuatable to adjust the outlet valve timer 292 to obtain a desired rate of flow of water from the cylinder 384 through the check valve assembly to the discharge outlet 428. This flow rate is such that the water is not fully discharged from the cylinder 384 until a desired period of time has elapsed after the handle 40c has been manually released.

The adjustment screw 332 can be turned to vary the size of an opening through which water flows from the head end portion of the cylinder 384 to the discharge outlet 428. The screw 332 is connected to a needle valve through which water is conducted from the cylinder 384 through the discharge outlet 428 to the body of water 12c in the main tank 10c. Alternatively, the screw 432 may engage a flexible member which, when the screw is turned, is resiliently deflected to vary the size of an opening through which water flows from the cylinder 384 to the discharge outlet 428. As another example, the screw 432 may engage an internally threaded member connected to a movable flow control member.

The outlet valve timer screw 432 can be adjusted to have the outlet valve 20c close at the end of any desired time period after manually releasing the handle 40c. In one specific example, the outlet valve timer screw was adjusted to have the outlet valve 20c close approximately ten seconds after the handle 40c is released for movement to its unactuated condition. Of course, the outlet timer screw 432 can be adjusted to have the outlet valve 20c close after either a longer or shorter period of time has elapsed after manually releasing the handle 40c.

As water flows from the cylinder 384 through the check valve assembly in the outlet valve timer 292, the piston 386 moves upward in the cylinder 384 toward the position shown in FIG. 7. As this occurs, the rocker arm 390 pivots in a clockwise direction about the central portion 394 of the rocker arm and the outlet valve 20c pivots in a clockwise direction about the pivot connection 402. This results in the outlet valve 20c moving away from a fully opened condition toward a closed condition as water is discharged from the cylinder 384 through the outlet valve timer 292. Since the rate of flow of water through the check valve in the outlet valve 292 is adjustable with the adjustment screw 432, the amount of time required for the water to be discharged from the cylinder 384 is adjustable.

Once the predetermined time period required for the water to be discharged from the cylinder 384 through the outlet valve timer 292 has elapsed, the outlet valve 20c returns to the closed position of FIG. 7 and the piston 386 is in the raised position of FIG. 7. Throughout the discharge of water through the check valve in the outlet valve timer 292, the handle 40c will have been manually released and will be in its unactuated position. Therefore, the outlet valve 20c operates from its open condition to its closed condition a predetermined time period after the handle 40c is manually released.

When liquids are to be flushed from the toilet bowl, it is contemplated that an individual using the toilet will manually actuate the handle 40c and then immediately release the handle. When the handle 40c is initially actuated, the actuator arm 44c pivots upward (as viewed in FIG. 7) to open the outlet valve 20c. The manual actuation of the handle 40c operates the pump assembly 380 under the influence of force applied to the handle during manual actuation of the handle.

Upon the immediate release of the handle 40c, the actuator arm 44c pivots in a counterclockwise direction. The biasing weight 424 then initiates pivoting of the rocker arm 390 and operation of the pump assembly 380 to discharge water through the outlet valve timer 292. As this occurs, the outlet valve 20c discharges water into the toilet bowl to flush the liquids in the toilet bowl.

After the period of time determined by the outlet valve timer 292 has elapsed, the piston 386 will have moved upward to the position illustrated schematically in FIG. 7. The water discharged through the outlet valve 20 during the short flush time is adequate to flush liquids. The relatively small amount of water used during the short flush will be replaced by a flow of water from the inlet valve 26c through the outlet 350 into the body 12c of water. When the water line in the tank 10c has reached the level indicated in the dashed line at 14c in FIG. 7, water will flow over the rim 314 of the container 230c and raise the float 28c to operate the inlet valve 26c to the closed condition.

If solids are to be flushed from the bowl of the toilet, the individual who used the toilet will manually actuate the handle 40c and operate the outlet valve 20c to an open condition. At the same time, the pump assembly 380 will be actuated to induce a flow of water from the container 230c through the conduit 408 into the cylinder 384. This results in downward movement of the float 28c and actuation of the water inlet valve 26c to an open condition.

The individual using the toilet will hold the handle 40c in an actuated condition for a length of time sufficient to enable enough water to flow from the main tank 10c through the outlet 18c into the toilet bowl to flush the solids from the toilet. After the individual using the toilet sees that the solids have been flushed from the toilet bowl, he/she will release the handle 40c. When the handle 40c is released, the weight 424 will initiate operation of the pump assembly 380 to discharge water through the outlet valve timer 292. After a predetermined time period corresponding to the setting of the outlet valve timer 292 has occurred, the outlet valve 230c will move to the closed position and interrupt the flow of water from the tank 10c.

In view of the foregoing description, it is clear that the present invention relates to new and improved controls 50 (FIGS. 1-7) for use in association with a toilet. The controls 50c (FIG. 7) enable water to be conserved by allowing a user of the toilet to control the amount of water utilized for each flush of the toilet. The controls 50c enable water to be conserved by minimizing the amount of water lost in the event of either a minor leak or a major leak at one or more components of the toilet.

The controls 50c (FIG. 7) may include a force transmission assembly 288 which is operable to effect operation of an outlet valve 20c from a closed condition to an open condition under an influence of force transmitted from a toilet handle 40c upon manual actuation of the handle. This force transmission assembly 288 may also be operable to effect operation of an inlet valve 26c from a closed condition to an open condition under the influence of force transmitted from the toilet handle 40c upon actuation of the handle. In addition, the force transmission assembly 288 may be operable to effect operation of the inlet valve 26c from an open condition to a closed condition.

If desired, a separate body 232c of water may be maintained in a container 230c in the tank 10c. A float 28c may be disposed in the container 230c. If the outlet valve 20c leaks, water will flow from the tank 10c. However, since the float 28c engages the separate body 232c of water in the container 230c, the water inlet valve 26c will not open to replenish the water lost from the tank. An inlet valve timer 328 may be operable to effect operation of the inlet valve 26c from the open condition to the closed condition after the inlet valve has been in the open condition for a first period of time.

These controls may include a pump assembly 380 connected in fluid communication with the container 230c and operable under the influence of force transmitted from a manually actuated handle 40c. Operation of the pump assembly 380 induces a flow of water from the container 230c.

The immediately aforementioned controls 50c may also include an outlet valve timer 292. The outlet valve timer 292 is operable to prevent operation of an outlet valve 20c from an open condition to a closed condition for a second predetermined period of time after the handle 40c has been manually released. This results in the outlet valve 20c remaining in the open condition for a period of time which is equal to the period of time for which the handle 40c is in the actuated condition plus the second predetermined period of time during which the outlet valve timer 292 prevents operation of the outlet valve 20c to the closed condition. The second period of time may be shorter than the first predetermined period of time.

The controls 50c may include a force transmission assembly 288 which is effective to maintain the outlet valve 20c in an open condition as long as a handle 40c is manually held in an actuated position. The force transmission assembly 288 may include an outlet valve timer 292 which prevents operation of the outlet valve 20c from the open condition to a closed condition for a predetermined time after the handle 40c has been manually released. This results in the outlet valve 40c remaining in the open condition for a period of time which is equal to the period of time for which the handle 40c is manually held in the actuated position plus the predetermined period of time during which the outlet valve timer 292 prevents operation of the outlet valve to the closed condition.

The toilet controls 50 (FIGS. 1-7) of the present invention have many different features. These features may be utilized together in the manner disclosed herein. Alternatively, the features may be utilized separately or in various combinations with each other and/or with features from the prior art. For example, water inlet valve controls 284 (FIG. 7) having a construction similar to the construction disclosed herein may be used with water outlet valve controls 280 having a construction which is different than the construction disclosed herein. Similarly, water outlet valve controls 280 having a construction similar to the construction disclosed herein may be used with water inlet valve controls 280 having construction which is different than the construction disclosed herein.

Having described the invention, the following is claimed:

1. A toilet comprising a main tank which is connected with a toilet bowl, an inlet valve which is operable to an open condition to enable water to flow into said main tank and is operable to a closed condition to block a flow of water into said main tank, an outlet valve which is operable to an open condition to enable water to flow from said main tank into the toilet bowl and is operable to a closed condition to at least partially block a flow of water from said main tank into the toilet bowl, a handle which is movably mounted on said main tank and is manually actuatable from outside of said main tank, and a force transmission assembly connected with said handle and with said outlet valve and said inlet valve, said force transmission assembly being operable to effect operation of said outlet valve from a closed condition to an open condition under the influence of mechanical force transmitted from said handle upon manual actuation of said handle, said force transmission assembly being operable to effect operation of said inlet valve from a closed condition to an open condition under the influence of mechanical force transmitted from said handle upon manual actuation of said handle, said force transmission assembly being operable to effect operation of said inlet valve from an open condition to the closed condition, wherein said force transmission assembly includes a container which is disposed in said main tank and holds a body of water, and a float which is at least partially disposed in said container and is connected with said inlet valve, said float being movable from a first position in said container to a second condition in said container under the influence of mechanical force transmitted from said handle upon manual actuation of said handle, said container contains a first quantity of water when said float is in the first position, said container contains a second quantity of water when said float is in the second position, said second quantity of water is less than said first quantity of water, said float being movable from the second position in said container to the first position in said container to effect operation of said inlet valve from the open condition to the closed condition in response to accumulation of water in said container.

2. A toilet as set forth in claim 1 wherein said force transmission assembly is operable under the influence of mechanical force transmitted from said handle to induce a flow of water from said container to reduce the quantity of water in said container from said first quantity of water to said second quantity of water.

3. A toilet as set forth in claim 2 wherein said force transmission assembly includes a lever which is connected with said inlet valve, said float being connected with said lever, said force transmission assembly includes a flexible force transmission element which is connected with said lever and said handle, said flexible force transmission element being effective to transmit mechanical force which pulls said lever and said float downward relative to said container to force water to flow from said container and to operate said inlet valve from the closed condition to an open condition.

4. A toilet as set forth in claim 1 wherein said force transmission assembly includes a pump which is operable under the influence of mechanical force transmitted from said handle to induce a flow of water from said container to reduce the quantity of water in said container.

5. A toilet as set forth in claim 1 wherein said force transmission assembly is effective to maintain said outlet valve in the open condition as long as said handle is manually held in an actuated position, said force transmission assembly includes an outlet valve timer which prevents operation of said outlet valve from the open condition to the closed condition for a predetermined period of time after said handle has been manually released and has moved to an unactuated position so that said outlet valve remains in the open condition for the period of time for which said handle is manually held in the actuated position plus the predetermined period of time during which said outlet valve timer prevents operation of said outlet valve to the closed condition.

6. A toilet as set forth in claim 1 wherein said force transmission assembly includes an inlet valve timer which effects operation of said inlet valve from the open condition to the closed condition after said inlet valve has been in the open condition for a predetermined period of time.

7. A toilet comprising a main tank which holds water and is connected with a toilet bowl, an inlet conduit, an inlet valve which is connected with said inlet conduit and is operable to an open condition to enable water to flow through said inlet conduit into the main tank and is operable to a closed condition to block a flow of water through said inlet conduit into the main tank, an outlet valve which is operable to an open condition to enable water to flow from the main tank into the toilet bowl and is operable to a closed condition to at least partially block a flow of water from the main tank into the toilet bowl, a handle which is movably mounted on said main tank and is manually actuatable from outside of said main tank, a force transmission assembly connected with said handle and with said outlet valve, said force transmission assembly being operable to effect operation of said outlet valve from a closed condition to an open condition under the influence of mechanical force transmitted from said handle upon manual actuation of said handle, a container disposed in said main tank, and a float which is at least partially disposed in said container and is connected with said inlet valve and said handle, said float moves downward in said container under the influence of mechanical force transmitted from said handle to expel water from said container upon operation of said outlet valve from the closed condition to the open condition and while an upper surface of a body of water in said main tank is adjacent to an upper end portion of said container, said float moves upward in said container to transmit mechanical force from said float to said inlet valve to operate said inlet valve to the closed condition in response to said container filling with water.

8. A toilet as set forth in claim 7 wherein said force transmission assembly is connected with said float and is operable to transmit mechanical force from said handle to said float upon operation of said outlet valve from the closed condition to the open condition.

9. A toilet as set forth in claim 7 wherein said container has an upper end portion, said float being movable downward in said container to expel water from said container by inducing a flow of water from said upper end portion of said container.

* * * * *